United States Patent
Hayashi et al.

(10) Patent No.: US 12,535,202 B2
(45) Date of Patent: Jan. 27, 2026

(54) LIGHTING DEVICE, LIGHTING CONTROL METHOD, AND RECORDING MEDIUM

(71) Applicant: Panasonic Intellectual Property Management Co., Ltd., Osaka (JP)

(72) Inventors: Shintaro Hayashi, Hyogo (JP); Kenta Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 18/555,677

(22) PCT Filed: Apr. 15, 2022

(86) PCT No.: PCT/JP2022/017925
§ 371 (c)(1),
(2) Date: Oct. 16, 2023

(87) PCT Pub. No.: WO2022/230691
PCT Pub. Date: Nov. 3, 2022

(65) Prior Publication Data
US 2024/0125462 A1    Apr. 18, 2024

(30) Foreign Application Priority Data
Apr. 27, 2021   (JP) .................................. 2021-075396

(51) Int. Cl.
*F21V 23/04*    (2006.01)
*H05B 47/155*   (2020.01)
(Continued)

(52) U.S. Cl.
CPC ....... *F21V 23/0492* (2013.01); *H05B 47/155* (2020.01); *H05B 47/185* (2020.01); *F21Y 2107/40* (2016.08); *H05B 47/195* (2020.01)

(58) Field of Classification Search
CPC . F21V 23/0492; H05B 47/155; H05B 47/185; H05B 47/195; H05B 47/105;
(Continued)

(56) References Cited

U.S. PATENT DOCUMENTS 10,696,211 B2 *   6/2020   Fleszewski .......... B60Q 1/0023
D929,644 S   *   8/2021   Aravena ...................... D26/118
(Continued)

FOREIGN PATENT DOCUMENTS

JP   11-028973 A   2/1999
JP   11-028974 A   2/1999
(Continued)

OTHER PUBLICATIONS

International Search Report issued on Jun. 14, 2022 in International Patent Application No. PCT/JP2022/017925, with English translation.

*Primary Examiner* — Ryan Jager
(74) *Attorney, Agent, or Firm* — Rimon P.C.

(57) ABSTRACT

A lighting device includes: a plurality of light sources that illuminate in all directions; a first detector that detects an installation orientation of the lighting device; and a controller that changes a light-emission pattern of each of the plurality of light sources according to the installation orientation of the lighting device detected by the first detector.

7 Claims, 12 Drawing Sheets

(51) Int. Cl.
  *H05B 47/185* (2020.01)
  *F21Y 107/40* (2016.01)
  *H05B 47/195* (2020.01)

(58) Field of Classification Search
  CPC ............ H05B 47/1965; F21Y 2107/40; F21Y 2115/10; F21S 2/005; Y02B 20/40
  USPC ........................................................ 315/291
  See application file for complete search history.

(56) References Cited

U.S. PATENT DOCUMENTS

| | | | |
|---|---|---|---|
| D956,331 S * | 6/2022 | Horiki | D26/118 |
| 11,549,673 B2 * | 1/2023 | Franzosi | F21S 10/00 |
| 11,619,374 B1 * | 4/2023 | Lai | F21V 23/06 |
| | | | 362/249.01 |
| 2004/0080468 A1 | 4/2004 | Wakefield | |
| 2012/0181951 A1 * | 7/2012 | Van Der Zande | F21V 23/0442 |
| | | | 315/294 |
| 2013/0120989 A1 * | 5/2013 | Sun | F21S 10/02 |
| | | | 362/244 |
| 2017/0321867 A1 * | 11/2017 | Hagelaar | F21V 14/003 |
| 2018/0250493 A1 | 9/2018 | Kido et al. | |
| 2018/0320846 A1 * | 11/2018 | Sozzi | F21V 19/0055 |
| 2019/0329702 A1 * | 10/2019 | Fleszewski | B60Q 1/2611 |
| 2024/0125462 A1 * | 4/2024 | Hayashi | H05B 47/1965 |
| 2024/0310027 A1 * | 9/2024 | Watanabe | F21S 2/00 |

FOREIGN PATENT DOCUMENTS

| | | |
|---|---|---|
| JP | 11-028975 A | 2/1999 |
| JP | 3875710 B2 | 1/2007 |
| JP | 4594096 B2 | 12/2010 |
| JP | 2012-094302 A | 5/2012 |
| JP | 2013-179018 A | 9/2013 |
| JP | 2015-062185 A | 4/2015 |
| JP | 2017-056828 A | 3/2017 |
| JP | 2017-056829 A | 3/2017 |
| JP | 2017-538254 A | 12/2017 |
| JP | 2018-147606 A | 9/2018 |
| JP | 6464333 B1 * | 2/2019 |
| JP | 6464333 B2 | 2/2019 |
| JP | 2020-013774 A | 1/2020 |
| WO | 2016/075055 A1 | 5/2016 |

* cited by examiner

LIGHTING DEVICE, LIGHTING CONTROL METHOD, AND RECORDING MEDIUM

CROSS-REFERENCE OF RELATED APPLICATIONS

This application is the U.S. National Phase under 35 U.S.C. § 371 of International Patent Application No. PCT/JP2022/017925, filed on Apr. 15, 2022, which in turn claims the benefit of Japanese Patent Application No. 2021-075396, filed on Apr. 27, 2021, the entire disclosures of which applications are incorporated by reference herein.

TECHNICAL FIELD

The present disclosure relates to a lighting device, a lighting control method, and a recording medium.

BACKGROUND ART

Patent Literature (PTL) 1 discloses a light-transmissive display that modifies a format of a character displayed on the light-transmissive display, by being rotated about a first axis by approximately 180 degrees, when the light-transmissive display changes an orientation between a first orientation and a second orientation.

CITATION LIST

Patent Literature

[PTL 1] Japanese Patent No. 4594096

SUMMARY OF INVENTION

Technical Problem

However, when the light-transmissive display of PTL 1 is applied to a lighting device capable of illuminating in all directions, because orientations of the lighting device become more complex, it becomes difficult to set light-emission patterns.

In view of this, the present disclosure has an object to provide a lighting device capable of illuminating in all directions, a lighting control method, and a recording medium that make it easy to set light-emission patterns of the lighting device.

Solution to Problem

A lighting device according to one aspect of the present disclosure comprising: a plurality of light sources that illuminate in all directions; a detector that detects an installation orientation of the lighting device; and a controller that changes a light-emission pattern of each of the plurality of light sources according to the installation orientation of the lighting device detected by the detector.

A lighting control method according to one aspect of the present disclosure comprising: detecting an installation orientation of the lighting device; changing a light-emission pattern of each of a plurality of light sources according to the installation orientation, the plurality of light sources illuminating in all directions; and controlling each of the plurality of light sources to cause a light-emission pattern when the lighting device emits light in a first orientation and a light-emission pattern when the lighting device emits light in a second orientation to be maintained as a same light-emission pattern, the second orientation being different from the first orientation.

A non-transitory computer-readable recording medium according to one aspect of the present disclosure having recorded thereon a computer program for causing a computer to execute the lighting control method.

Advantageous Effects of Invention

The lighting device capable of illuminating in all directions or the like according to the present disclosure makes it easy to set the light-emission patterns of the lighting device.

DESCRIPTION OF EMBODIMENTS

It should be noted that each of the embodiments described below shows a general or specific example. The numerical values, shapes, materials, constituent elements, the arrangement and connection of the constituent elements, steps and the order of the steps, etc. indicated in the following embodiments are mere examples, and therefore are not intended to limit the present disclosure. Additionally, among the constituent elements in the following embodiments, those not recited in the independent claims are described as optional constituent elements.

Moreover, the respective figures are schematic diagrams and are not necessarily accurate illustrations. Furthermore, in the figures, the same constituent elements are assigned the same reference signs. In addition, terms such as "substantially spherical shape" are used in the following embodiments. For example, "substantially spherical shape" means not only "completely spherical shape," but also "substantially spherical shape," so that the meaning includes an error of about several percent, for example. Further, "substantially spherical shape" means a spherical shape in a range in which the present disclosure achieves advantageous effects. The same applies to other expressions that include "substantially."

Hereinafter, an embodiment is described in details with reference to the drawings.

Embodiment

<Configuration: Lighting System 1>

A configuration of lighting device 2 and lighting system 1 according to an embodiment is described.

Figure 1:
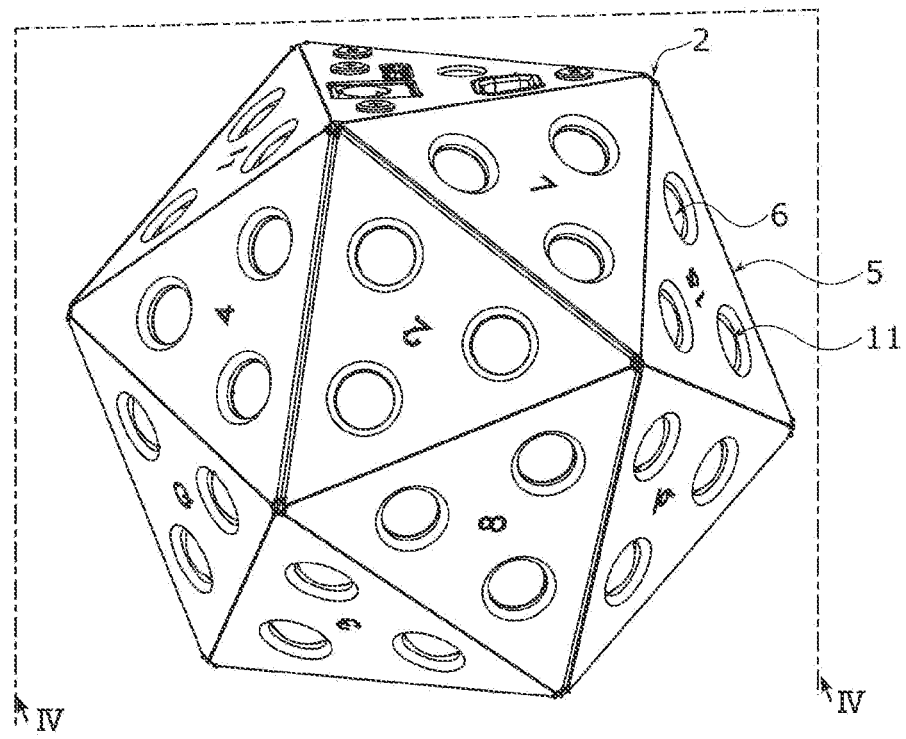
FIG. 1 is a perspective view of a lighting device according to an embodiment.
Figure 2:
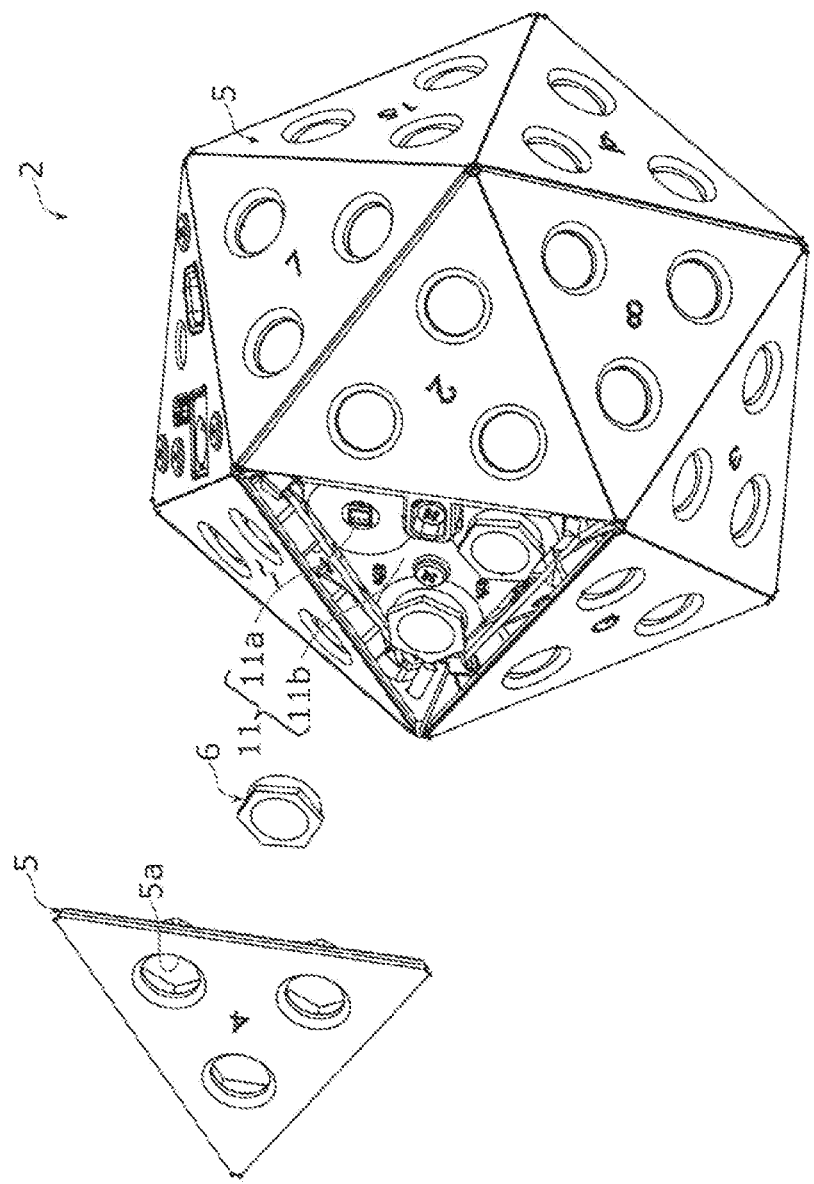
FIG. 2 is an exploded perspective view of the lighting device according to the embodiment.
Figure 3:
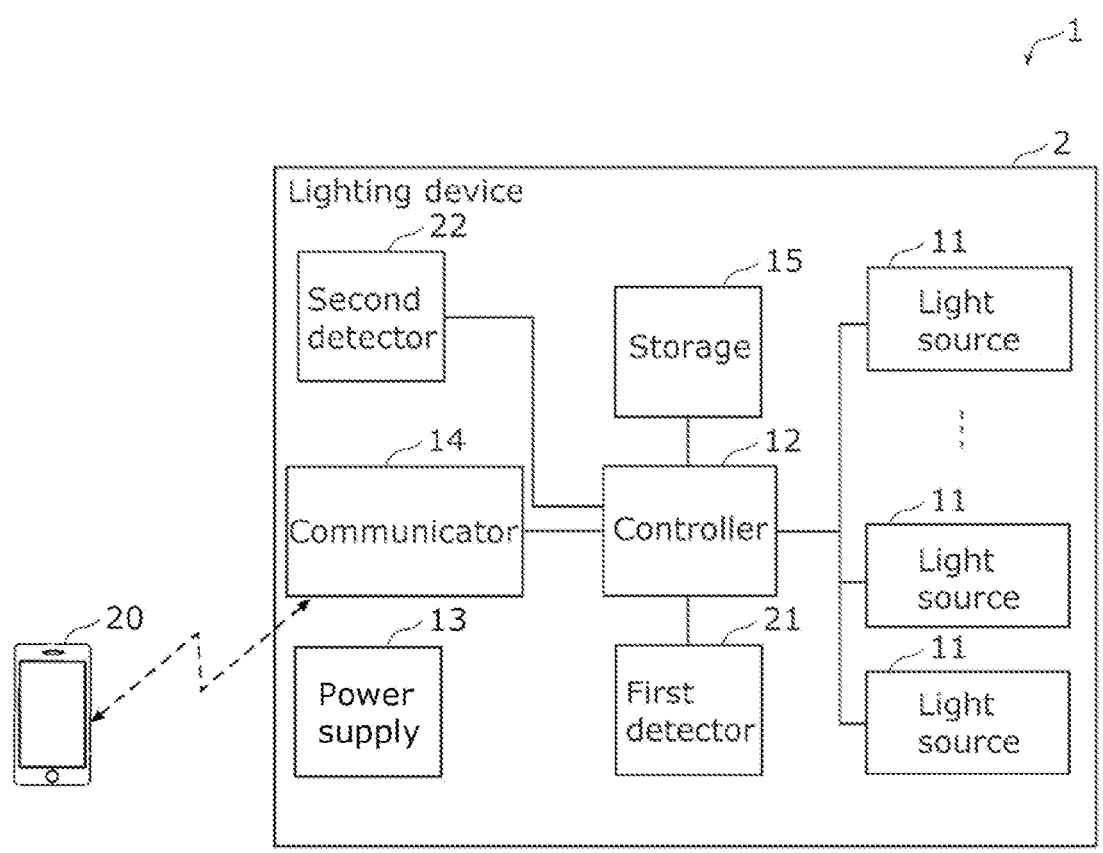
FIG. 3 is a block diagram illustrating the lighting device according to the embodiment.

FIG. 1 is a perspective view of lighting device 2 according to the embodiment. FIG. 2 is an exploded perspective view of lighting device 2 according to the embodiment. FIG. 3 is a block diagram illustrating lighting device 2 according to the embodiment.

As shown in FIG. 1 to FIG. 3, lighting system 1 sets a light-emission pattern of lighting device 2 in response to an operation performed on terminal device 20 shown in FIG. 3, and controls lighting device 2 based on control information for executing the light-emission pattern set. In other words, lighting system 1 is capable of controlling a light-emission pattern of lighting device 2 by controlling light-emission patterns of a plurality of light sources 11 of lighting device 2, such as lighting on and off, lighting (illumination) directions, luminance (brightness), light colors, or the like, according to control information.

It should be noted that lighting system 1 is capable of obtaining, from an external device via a network, control information in which a light-emission pattern of lighting device 2 is set, and of controlling lighting device 2 based on the control information or setting lighting device 2 to a light-emission pattern included in control information and controlling lighting device 2 based on the light-emission pattern set. In addition, the external device is a system or a terminal device other than lighting system 1.

Lighting system 1 includes lighting device 2 and terminal device 20. Although lighting device 2 is exemplified in the present embodiment, a plurality of lighting devices 2 may be used, and the present disclosure is not limited to one lighting device 2.

[Lighting Device 2]

Lighting device 2 is installed on, for example, a ceiling, a floor, a wall, or a desk in a room of a building. The outer shape of lighting device 2 is, for example, a substantially spherical shape or a substantially polyhedron shape. Lighting device 2 includes a plurality of light sources 11. The plurality of light sources 11 are disposed across lighting device 2. Accordingly, since the plurality of light sources 11 enable lighting device 2 to emit light in all directions, lighting device 2 is capable of illuminating in all directions. Specifically, lighting device 2 is a luminaire that causes the plurality of light sources 11 each radiating light in a corresponding direction to radiate (provide) light in all directions of 360 degrees. All directions of 360 degrees refer to all directions from the center of lighting device 2 toward any points on a light-emitting face.

Moreover, lighting device 2 radiates light in any directions from lighting device 2 as the center, by selectively causing the plurality of light sources 11 to emit light. To put it another way, radiation directions of light radiated from lighting device 2 are optional. For example, lighting device 2 radiates light in all directions of 360 degrees by causing all of the plurality of light sources 11 to emit light simultaneously, or radiates light only in some of directions by causing some of the plurality of light sources 11 to emit light. To be more precise, lighting device 2 not only radiates light in all directions of 360 degrees but also radiates light in any directions in the same manner as spotlights.

Furthermore, lighting device 2 makes it possible to radiate light in a certain direction according to a light-emission pattern, by being initialized. In other words, when lighting device 2 is initialized after being installed, lighting device 2 is capable of radiating light in a certain direction even when the installation orientation of lighting device 2 is changed. Examples of an installation orientation include an orientation, a placement position, and a tilt of lighting device 2.

Moreover, lighting device 2 has a dimming control function and a toning control function. Specifically, lighting device 2 changes a luminance (brightness) and a light color (color temperature or color) of light to be emitted. In the present embodiment, lighting device 2 changes a luminance and a light color of light for each of the plurality of light sources 11.

Furthermore, lighting device 2 according to the present embodiment evenly illuminates an object such as a wall surface with light in full color. For this reason, as describe below, a light source of three colors of red, green, and blue (RGB) is used as each of the plurality of light sources 11. Additionally, the plurality of light sources 11 are evenly and dispersedly disposed at high densities. Accordingly, by controlling light to be radiated, lighting device 2 makes it possible to produce a space in which lighting device 2 is disposed.

Moreover, unlike a display that displays an image, since lighting device 2 according to the present embodiment needs to illuminate a wall surface or the like with light, the plurality of light sources 11 need to produce a high light output. For this reason, a luminance per light source 11 is high compared to a light-emitting diode (LED) light source used for a backlight of a liquid crystal display, or an LED light source used for an LED display.

Lighting device 2 includes case 5, light-transmissive portion 6, a plurality of light sources 11, first detector 21, second detector 22, controller 12, power supply 13, storage 15, and communicator 14.

Case 5 is an outer cover that is in a substantially spherical shape or the outer shape of a polyhedron. In the present embodiment, the outer shape of case 5 is formed in a polyhedron. Stated differently, the outer surface of case 5 includes a plurality of faces. Specifically, the outer shape of case 5 is formed in an icosahedron having twelve vertices. To put it differently, the outer surface of case 5 includes twenty equilateral triangular faces.

Furthermore, case 5 according to the present embodiment includes, for example, white or black acrylonitrile butadiene styrene (ABS) or poly carbonate (PC) that has a thickness of approximately 1 mm to 2 mm.

Figure 4:
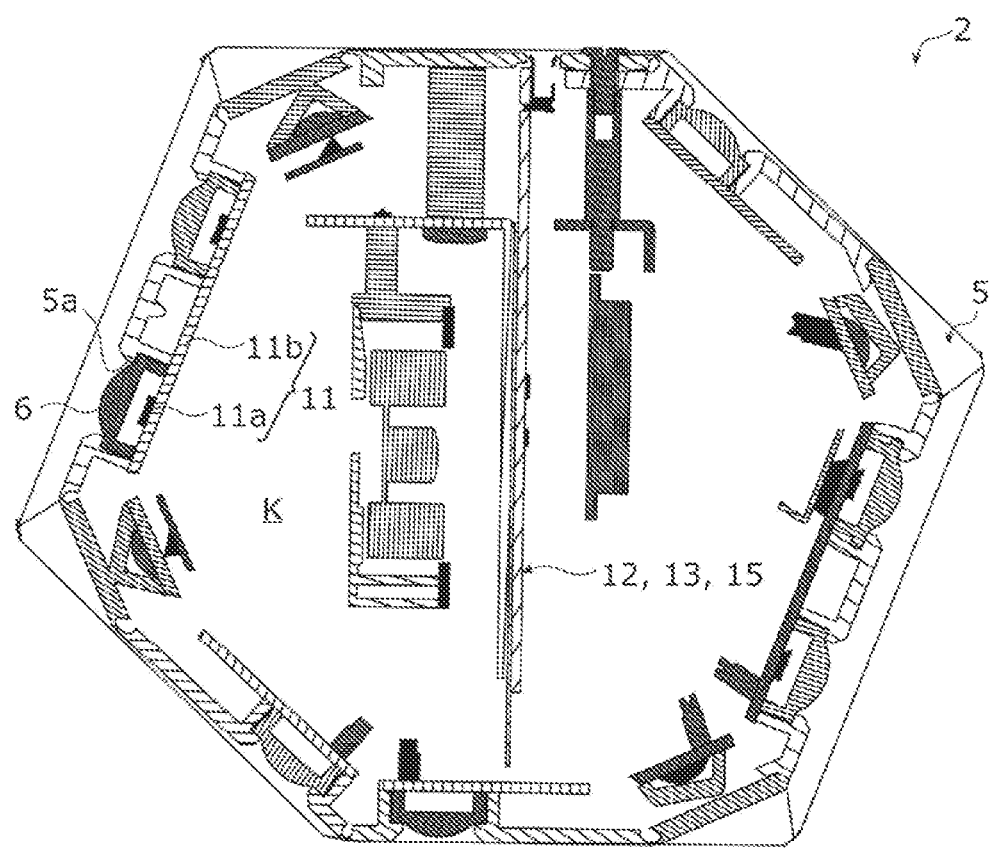
FIG. 4 is a cross-sectional view of the lighting device, taken along line IV-IV shown in FIG. 1.

As shown in FIG. 4, internal space K that is hollow is provided in case 5. The plurality of light sources 11, controller 12, power supply 13, storage 15, etc. are disposed in internal space K. In other words, internal space K is a controller installation space for installing the plurality of light sources 11, controller 12, power supply 13, storage 15, etc. FIG. 4 is a cross-sectional view of lighting device 2, taken along line IV-IV shown in FIG. 1.

As shown in FIG. 2 and FIG. 4, a plurality of through holes 5a for transmitting light emitted by each of a plurality of light-emitting elements 11a are provided in case 5. The plurality of through holes 5a correspond to the plurality of light-emitting elements 11a on a one-to-one basis, and are provided in positions opposite to positions of the plurality of light-emitting elements 11a. In the present embodiment, three through holes 5a are provided in each of the equilateral triangular flat faces that constitute the outer surface of case 5.

Each of a plurality of light-transmissive portions 6 is provided to a different one of the plurality of through holes 5a of case 5, to transmit light emitted from a corresponding one of the plurality of light sources 11. The plurality of light-transmissive portions 6 correspond to the plurality of light-emitting elements 11a on a one-to-one basis, and are provided opposite to the plurality of light-emitting elements 11a. Specifically, each of the plurality of light-transmissive portions 6 is provided on a corresponding one of corner portion sides of the equilateral triangular shape on a corresponding one of the equilateral triangular faces. Additionally, each of the plurality of light-transmissive portions 6 is provided to be coincident with the optical axis of a corresponding one of the plurality of light-emitting elements 11a.

Light-transmissive portion 6 includes a resin material that is light-transmissive such as transparent resin, or a light-transmissive component such as a transparent glass material. Light-transmissive portion 6 is fit in through hole 5a provided in case 5. In the present embodiment, a front view shape of through hole 5a is a circular shape. It should be noted that light-transmissive portion 6 serves as a lens that controls a distribution of light of light-emitting element 11a that passes through light-transmissive portion 6. As an example, light-transmissive portion 6 is a lens that diffuses and performs light distribution control on light of light-emitting element 11a that passes through light-transmissive portion 6. A plurality of microasperities (dots, prisms) are formed on the surface of light-transmissive portion 6 by, for example, surface texturing, or a dot pattern is printed on the surface of the same. This makes it difficult to visually recognize light-emitting element 11a inside case 5 through light-transmissive portion 6 from the outside.

Each of the plurality of light sources 11 is a light-emitting module that includes at least one light-emitting element 11a. In the present embodiment, each light source 11 includes a plurality of light-emitting elements 11a. Each of the plurality of light sources 11 emits light in a predetermined light-emission pattern, based on control information from controller 12.

The plurality of light sources 11 are disposed to form a substantially spherical outer shape or a substantially polyhedron outer shape. In the present embodiment, the plurality of light sources 11 form an icosahedral outer shape having twelve vertices. It should be noted that light sources 11 and connecting substrates disposed on nineteen equilateral triangular faces are provided in the present embodiment. In addition, the plurality of light sources 11 may be disposed on twenty equilateral triangular faces in the present embodiment.

Each of the plurality of light sources 11 includes light-emitting element 11a and substrate 11b.

The plurality of light-emitting elements 11a are substantially disposed across lighting device 2. In other words, the plurality of light-emitting elements 11a are scattered to make it possible to radiate light in all direction from lighting device 2. Each light-emitting element 11a makes it possible to illuminate in a corresponding direction. In the present embodiment, since a plurality of light-emitting elements 11a are mounted on one substrate 11b, directions in which the plurality of light-emitting elements 11a emit light are identical to each other on the same substrate. It should be noted that directions in which respective light-emitting elements 11a emit light may be different from each other. Each of the plurality of light-emitting elements 11a emits light toward the outside of lighting device 2. Specifically, the optical axis of each of the plurality of light-emitting elements 11a is orthogonal to the mounting surface of substrate 11b. The optical axis is a straight line along principal light emitted by each of the plurality of light-emitting elements 11a.

Moreover, each light-emitting element 11a emits light in at least two colors. Specifically, each light-emitting element 11a is a light source of three colors of RGB, emits monochromatic light in three colors such as red light, blue light, and green light, and at the same time emits color light or white light that is obtained by dimming the monochromatic light in these three colors.

Specifically, each light-emitting element 11a is a surface-mounted device (SMD) LED element in which an LED is packaged, and includes a container (package), a plurality of LED chips mounted within the container, and a seal component that seals the plurality of LED chips. In the present embodiment, red LED chips that emit red light, blue LED chips that emit blue light, and green LED chips that emit green light are mounted as the plurality of LED chips. The seal component is a light-transmissive insulative resin material such as silicone resin. It should be noted that a light diffusing material such as silica, a filer, or the like may be dispersed in the seal component.

Light-emitting element 11a thus configured is mounted on the mounting surface of substrate 11b. In the present embodiment, a plurality of light-emitting elements 11a are mounted on one substrate 11b. The plurality of light-emitting elements 11a are disposed at specified intervals when lighting device 2 is viewed as a whole. In the present embodiment, three light-emitting elements 11a are mounted on one substrate 11b. Additionally, a plurality of light-emitting elements 11a are disposed at specified intervals on each of substrates 11b.

Substrate 11b is a mounting substrate including a mounting surface for mounting light-emitting element 11a. It should be noted that, though not shown in the figure, metal wiring, a connector for power supply, etc. are provided on the mounting surface of substrate 11b. In the present embodiment, a plurality of substrates 11b are electrically connected to controller 12 with single wiring by the connectors of the plurality of substrates 11b being mutually electrically connected to each other.

Furthermore, the shape of each substrate 11b is a shape having rotation symmetry. In other words, the shape of each substrate 11b is, for example, a circular shape or a polygonal shape. In the present embodiment, substrate 11b is in a shape corresponding to a polygonal face that forms a portion of the outer surface of case 5 in the substantially polyhedron shape. In the present embodiment, substrate 11b comprises substrates 11b in an equilateral triangular shape in a plan view. A polyhedron is formed by combining the plurality of substrates 11b in the equilateral triangular shape. As described above, lighting device 2 is formed in a substantially spherical shape or a polyhedron shape by the plurality of substrates 11b.

Each substrate 11b is fastened to case 5 in the polyhedron shape with a fastening component such as a screw. In the present embodiment, case 5 is an icosahedron. For this reason, case 5 makes it possible to dispose a plurality of light sources 11 on the icosahedron.

It should be noted that a power supply connector that supplies power to power supply 13 from an external power source, a communication connector that communicates with an external device and a terminal device, and a connecting portion to which a metal hook serving as a fastening component for fastening lighting device 2 to, for example, a ceiling or a wall is connected are provided on a predetermined face of the icosahedron in the present embodiment. For this reason, no light source 11 is disposed on the predetermined face in the present embodiment. To put it another way, case 5 makes it possible to dispose a plurality of light sources 11 on nineteen faces of the icosahedron in the present embodiment.

A plurality of light-emitting elements 11a are regularly disposed on substrate 11b. In the present embodiment, each of light-emitting elements 11a (three in total) is mounted on a corresponding one of corner portion sides of the equilateral triangular shape of substrate 11b. In the present embodiment, since light sources 11 are disposed on the nineteen faces of the icosahedron, lighting device 2 includes 57 (=19 faces×3) light-emitting elements 11a.

Examples of substrate 11b include: a metal base substrate obtained by applying an insulating film to a base material including a metal material such as aluminum or copper; a ceramic substrate that is a sintered compact of a ceramic material such as alumina; or a resin substrate including a resin material as a base. In the present embodiment, a printed circuit substrate including a glass epoxy substrate in which metal wiring is formed is used as substrate 11b. It should be noted that substrate 11b is a rigid substrate but may be a flexible substrate.

First detector 21 detects an installation orientation of lighting device 2. First detector 21 outputs, to controller 12, information indicating the installation orientation of lighting device 2 detected. Here, an installation orientation of lighting device 2 is a tilt of lighting device 2 based on the amount of change relative to, for example, an initial origin factory-predetermined or the origin set by an initial setting. Additionally, an installation orientation is not limited to being fastened to a ceiling, a floor, a wall, a desk, etc., and includes an orientation resulting from being simply disposed on a floor, a desk, etc. First detector 21 is an example of a detector.

Moreover, first detector 21 detects a rotational acceleration rate of lighting device 2 that is the amount of change in an orientation installation of lighting device 2. First detector 21 outputs, to controller 12, information indicating the rotational acceleration rate of lighting device 2 detected.

In the present embodiment, first detector 21 is a gyroscope sensor that is capable of detecting not only an installation orientation of lighting device 2 but also a rotational acceleration rate of lighting device 2. Additionally, in the present embodiment, first detector 21 includes at least detectors of two systems to make it possible to detect amounts of rotation about at least two axes. Accordingly, in the present embodiment, first detector 21 is capable of detecting amounts of rotation about at least two axes (at least two of the pitch axis, the roll axis, or the yaw axis) orthogonal to each other in lighting device 2. It should be noted that a detector capable of detecting an installation orientation of lighting device 2 and a detector capable of detecting a rotational acceleration rate of lighting device 2 may be separate detectors.

Second detector 22 detects northward, southward, eastward, westward, upward, and downward directions with respect to lighting device 2. Second detector 22 outputs, to controller 12, information indicating the northward, southward, eastward, westward, upward, and downward directions with respect to lighting device 2 detected. Additionally, second detector 22 is at least one of a gyroscope sensor or an electronic compass. In the present embodiment, a direction is, for example, a direction of an initial origin factory-predetermined or the origin set by an initial setting etc. with respect to the center of lighting device 2. Second detector 22 is an example of the detector.

Controller 12 is a control circuit that controls each part of lighting device 2. Controller 12 performs various types of control by, for example, a processor executing a program held in storage 15. The processor includes, for example, a micro processing unit (MPU), central processing unit (CPU), a digital signal processor (DSP), a graphical processing unit (GPU), or a system on a chip (SoC).

Moreover, controller 12 executes light-emission patterns stored in storage 15 to control a plurality of light sources 11 according to the light-emission patterns. Specifically, controller 12 controls a light-emission pattern in which each light source 11 emits light, to cause light source 11 to emit light in the light-emission pattern according to control information obtained from storage 15 or an external device. In other words, controller 12 separately causes all light sources 11 included in lighting device 2 to change respective light-emission patterns in which light sources 11 emit light. For example, controller 12 controls lighting on and off (lighting on, lighting off) or changes a brightness or a light color according to the light-emission pattern of each light source 11.

Here, control information includes luminance information indicating a luminance of light emitted by predetermined light source 11 among a plurality of light sources 11 to be controlled, and color information indicating a light color of the light emitted by predetermined light source 11. In addition, the control information includes, for example, an identifier of light source 11 to be caused to emit light, and a period in which light source 11 corresponding to the identifier emits light.

Furthermore, controller 12 changes each of light-emission patterns that are temporal changes in light emission by a plurality of light sources 11, according to the installation orientation of lighting device 2 detected by first detector 21. In other words, controller 12 changes each of the light-emission patterns of the plurality of light sources 11 according to a change in installation orientation of lighting device 2.

Specifically, when an installation orientation of lighting device 2 is changed after lighting device 2 is installed and initialized, controller 12 changes each of the light-emission patterns of the plurality of light sources 11 according to the installation orientation changed. More specifically, controller 12 changes each of the light-emission patterns of the plurality of light sources 11, based on the installation orientation of lighting device 2 indicated in the information obtained from first detector 21. For example, controller 12 causes the plurality of light sources 11 to illuminate in a first light-emission pattern when lighting device 2 is in a first orientation; and causes the plurality of light sources 11 to illuminate in a second light-emission pattern that is different from the first light-emission pattern, when an installation orientation of lighting device 2 is changed to a second orientation that is different from the first orientation.

To put it another way, controller 12 controls each of the plurality of light sources 11 to cause a light-emission pattern when lighting device 2 emits light in the first orientation and a light-emission pattern when lighting device 2 emits light in the second orientation different from the first orientation to be maintained as the same light-emission pattern. For this reason, even when the installation orientation of lighting device 2 is changed, controller 12 controls the plurality of light sources 11 to substantially maintain (keep) the light-emission positions in the case where lighting device 2 is observed from a fixed point. Consequently, since directions or the like in which light is emitted are originally changed when the installation orientation of lighting device 2 is changed, a lighting pattern on an illuminated surface is also changed. However, since lighting device 2 according to the present embodiment maintains the light-emission patterns even when the installation orientation is changed, the lighting pattern on the illuminated surface is not also substantially changed.

Moreover, controller 12 estimates an amount of change in the light-emission pattern of each of the plurality of light sources 11 according to the rotational acceleration rate detected by first detector 21, and controls the light-emission pattern of each of the plurality of light sources 11.

Specifically, when lighting device 2 is changed from the first orientation to the second orientation, controller 12 makes it possible to predict the change from the first orientation to the second orientation, based on the rotational acceleration rate indicated in the information obtained from first detector 21. For this reason, even when the orientation of lighting device 2 is rapidly changed, controller 12 controls each of the plurality of light sources 11 to cause the light-emission pattern when the light is emitted in the first orientation and the light-emission pattern when the light is emitted in the second orientation to be maintained as the same light-emission pattern in the case where lighting device 2 is observed from the fixed point.

Furthermore, controller 12 sets a default value according to the northward, southward, eastward, westward, upward, and downward directions with respect to lighting device 2 detected by second detector 22. Specifically, controller 12 causes each of the plurality of light sources 11 to maintain the light-emission pattern based on the origin of lighting device 2 set and the northward, southward, eastward, westward, upward, and downward directions with respect to lighting device 2 indicated in the information obtained from second detector 22.

Moreover, in the present embodiment, controller 12 is a control circuit in an elongated plate shape and is disposed in case 5 to be oriented perpendicularly to a predetermined face on which, for example, a power supply connector is provided. Specifically, controller 12 is disposed in a standing-up orientation substantially perpendicular to the predetermined face. Consequently, compared to a case in which controller 12 is disposed substantially parallel to the predetermined face, it is possible to dispose controller 12 without compressing electronic components included in controller 12 while preventing an increase in area of a substrate included in controller 12.

Power supply 13 serves to supply power to each part of lighting device 2. Power supply 13 is, for example, a power supply circuit in which a plurality of electronic components are mounted on a printed substrate. Power supply 13 generates, for example, driving power for causing each of a plurality of light sources 11 to emit light. Specifically, power supply 13 generates driving power for causing each light source 11 to emit light, and supplies the driving power to each light source 11. In other words, power supply 13 converts commercial alternating-current power to direct-current power, and supplies, as driving power for causing each light source 11 to emit light, the direct-current power to cause each light source 11 to emit light.

Communicator 14 serves to communicate with terminal device 20. Specifically, communicator 14 receives, from terminal device 20, an instruction for initialization or control information for controlling a light-emission pattern of lighting device 2. The instruction and the control information received by communicator 14 are outputted to controller 12. Examples of a communication scheme used by communicator 14 include wide area network (WAN), local area network (LAN), power line communication, infrared communication, near field communication (e.g., Bluetooth (registered trademark) communication), or mobile communication for mobile phones.

Storage 15 stores, for example, directions with respect to lighting device 2 indicated by the origin set by the initialization, and light-emission patterns of a plurality of light sources 11. Moreover, light-emission patterns are stored into storage 15 by being set by terminal device 20 or being obtained from an external device. Furthermore, control information or the like obtained by controller 12 is periodically stored into storage 15. Storage 15 includes, for example, a primary storage device such as random-access memory (RAM) and read-only memory (ROM). Additionally, storage 15 may include a secondary storage device such as a hard disk drive (HDD) and a solid state drive (SSD) or a tertiary storage device such as an optical disk and an SD card.

[Terminal Device 20]

By accepting an operation inputted by a user, terminal device 20 makes it possible to set, from among the plurality of light sources 11 of lighting device 2, light source 11 that is the origin, to maintain a light-emission pattern even when an orientation of lighting device 2 is changed.

Moreover, by accepting an operation inputted by the user, terminal device 20 generates, for each of the plurality of light sources 11, control information for controlling a light-emission pattern such as lighting on and off, luminance, a light color, a light-emission period, and blinking. Specifically, terminal device 20 causes a display to display a setting screen for setting a light-emission pattern of lighting device 2, accepts an operation inputted by the user, and generates control information in which the light-emission pattern of lighting device 2 is set based on the operation accepted. By transmitting the control information to lighting device 2, terminal device 20 causes the light-emission pattern of lighting device 2 to change.

Terminal device 20 is a device capable of controlling lighting device 2. For example, terminal device 20 is a mobile terminal such as a smartphone or a tablet terminal operated by a user. It should be noted that terminal device 20 is not limited to a mobile terminal, and may be a stationary terminal such as a desktop personal computer. In addition, terminal device 20 may be a terminal capable of controlling other devices in addition to lighting device 2 or a terminal such as a dedicated remote controller that controls only lighting device 2.

<Processing Operation>

Next, a processing operation for lighting device 2, the lighting control method, and the program according to the present embodiment is described.

Operation Example 1

In the present operation example, a case in which a user initializes lighting device 2 after lighting device 2 is disposed in a predetermined installation orientation is described with reference to FIG. 5 to FIG. 7.

Figure 5:
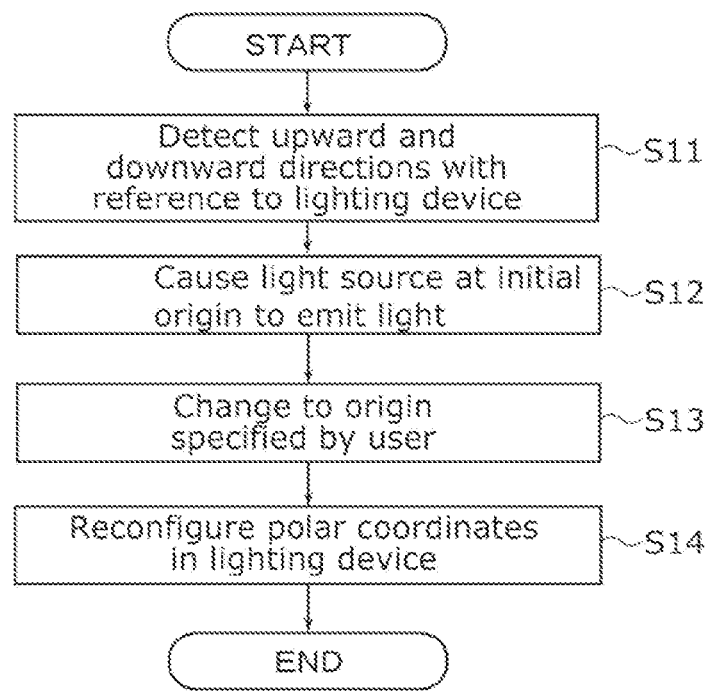
FIG. 5 is a flow chart illustrating a processing operation when the lighting device according to the embodiment is initialized.
Figure 6:
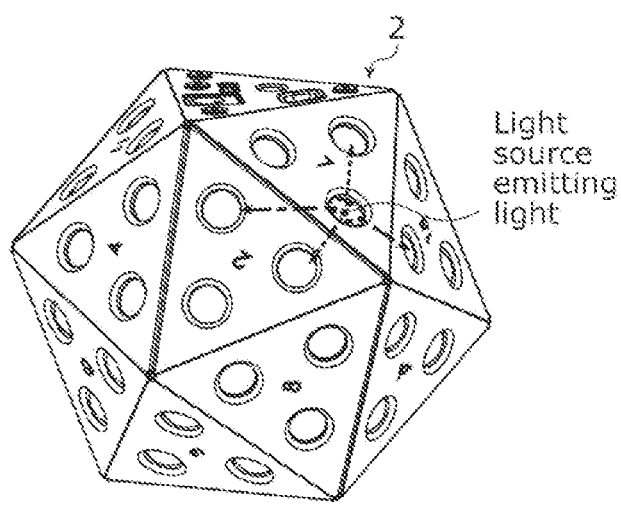
FIG. 6 is a diagram illustrating a light-emission position when the origin of a light source is set, in the initialization of the lighting device according to the embodiment.

FIG. 5 is a flow chart illustrating a processing operation when lighting device 2 according to the embodiment is initialized. FIG. 6 is a diagram illustrating a state in which the origin of light source 11 is set in the initialization of lighting device 2 according to the embodiment. FIG. 7 is a diagram illustrating a state in which polar coordinates in lighting device 2 according to the embodiment are reconfigured in the initialization of lighting device 2.

First, by operating terminal 20, the user starts lighting device 2 to initialize lighting device 2. As shown in FIG. 5, second detector 22 detects upward and downward directions (orientations) with respect to lighting device 2 (S11). In other words, second detector 22 detects the upward and downward directions with respect to lighting device 2 disposed in a predetermined installation orientation. Second detector 22 outputs, to controller 12, information indicating the upward and downward directions with respect to lighting device 2 detected. Controller 12 stores, into storage 15, the information indicating the upward and downward directions with respect to lighting device 2 obtained.

Next, controller 12 of lighting device 2 causes light source 11 at an initial origin to emit light (S12). The initial origin is an origin preset at the time of the initialization. For example, the initial origin is an origin factory-preset for lighting device 2. It should be noted that the initial origin may be set on a face opposite to a predetermined face on which, for example, a power supply connector is provided. It should be noted that when, for example, lighting device 2 is hung, controller 12 may automatically set the initial origin to cause light source 11 located on the vertically lower side to be the origin.

Then, the user sets the origin of lighting device 2 by operating terminal device 20. Lighting device 2 according to the present embodiment sets, as the initialization of lighting device 2, the origin that determines a radiation direction in which lighting device 2 radiates light. In view of this, by operating terminal device 20, the user sets light source 11 that is the origin from among the plurality of light sources 11 in lighting device 2. For example, by the user operating terminal device 20, lighting device 2 receives, from terminal device 20, control information corresponding to the operation made by the user. Accordingly, controller 12 makes a switch to, among the plurality of light sources 11, light source 11 to be caused to emit light, according to the control information received. As shown in FIG. 6, for example, the position (dot hatching) of light source 11 that emits light is changed in one of directions indicated by dashed arrows, by the user operating a button for switching between upward and downward directions on terminal device 20, or the position of light source 11 that emits light is changed in one of directions indicated by dashed-dotted arrows, by the user operating a button for switching between leftward and rightward directions on terminal device 20. A switch to light source 11 caused to emit light is made until the user sets the origin.

When the user sets the origin by operating terminal device 20, controller 12 stores, into storage 15, origin setting information that is information indicating the origin set by the user, and makes a switch to the origin set by the user (S13).

After that, when controller 12 makes the switch to the origin set by the user, controller 12 reconfigures polar coordinates in lighting device 2 (S14).

Figure 7:
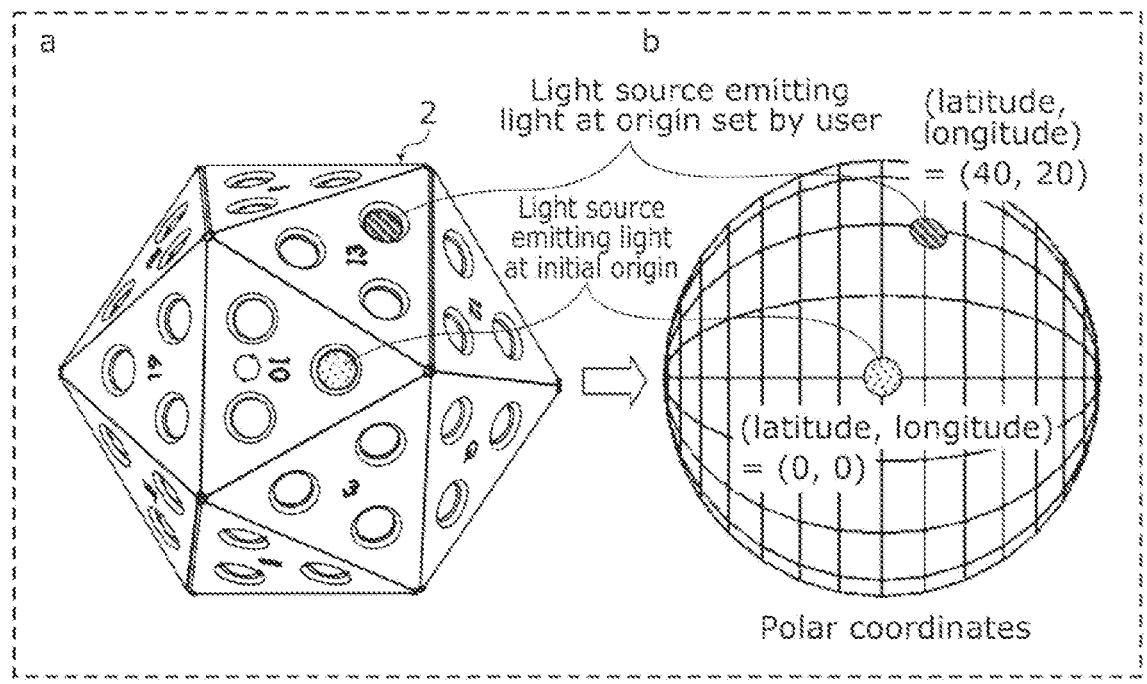
FIG. 7 is a diagram illustrating a state in which polar coordinates in the lighting device according to the embodiment are reconfigured in the initialization of the lighting device.

Specifically, controller 12 compares lighting device 2 shown in (a) in FIG. 7 to polar coordinates shown in (b) in FIG. 7, and assigns the positions of the plurality of light sources 11 provided on lighting device 2 to virtual polar coordinates. As shown in (a) and (b) in FIG. 7, the initial origin is represented by dot hatching having (latitude, longitude)=(0, 0), and the origin set by the user is represented by diagonal hatching having (latitude, longitude)=(40, 20). An offset value of the origin set by the user relative to the initial origin is determined to cause the origin (40, 20) set by the user and the initial origin (0, 0) to match. As stated above, controller 12 reconfigures the origin set by the user. Accordingly, the origin set by the user becomes the origin set in the initialization.

Finally, the initialization of lighting device 2 is completed.

Consequently, it is possible to find out, for example, an amount of change in installation orientation of lighting device 2 based on the upward and downward directions with respect to lighting device 2 and the origin set by the user relative to the center of lighting device 2. For this reason, even when each of a plurality of lighting devices 2 is disposed in a different installation orientation and a different orientation, it is possible to uniform light-emission patterns for all radiation directions of the plurality of lighting devices 2, by performing the initialization described in the present operation example to cause all polar coordinates of the plurality of lighting devices 2 to be common polar coordinates.

Operation Example 2

In the present operation example, a case in which an installation orientation of lighting device 2 is changed is described with reference to FIG. 8 and FIG. 9.

Figure 8:
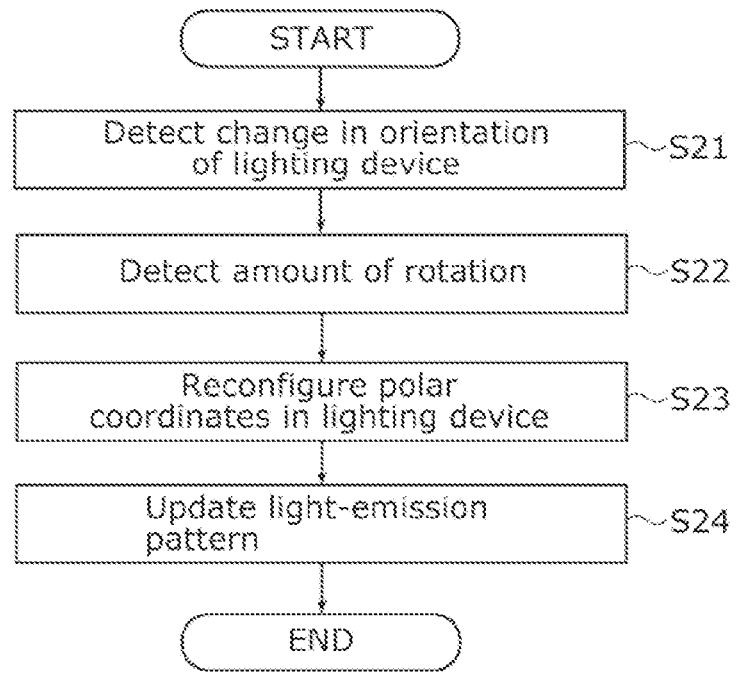
FIG. 8 is a flow chart illustrating a processing operation when an installation orientation of the lighting device according to the embodiment is changed.
Figure 9:
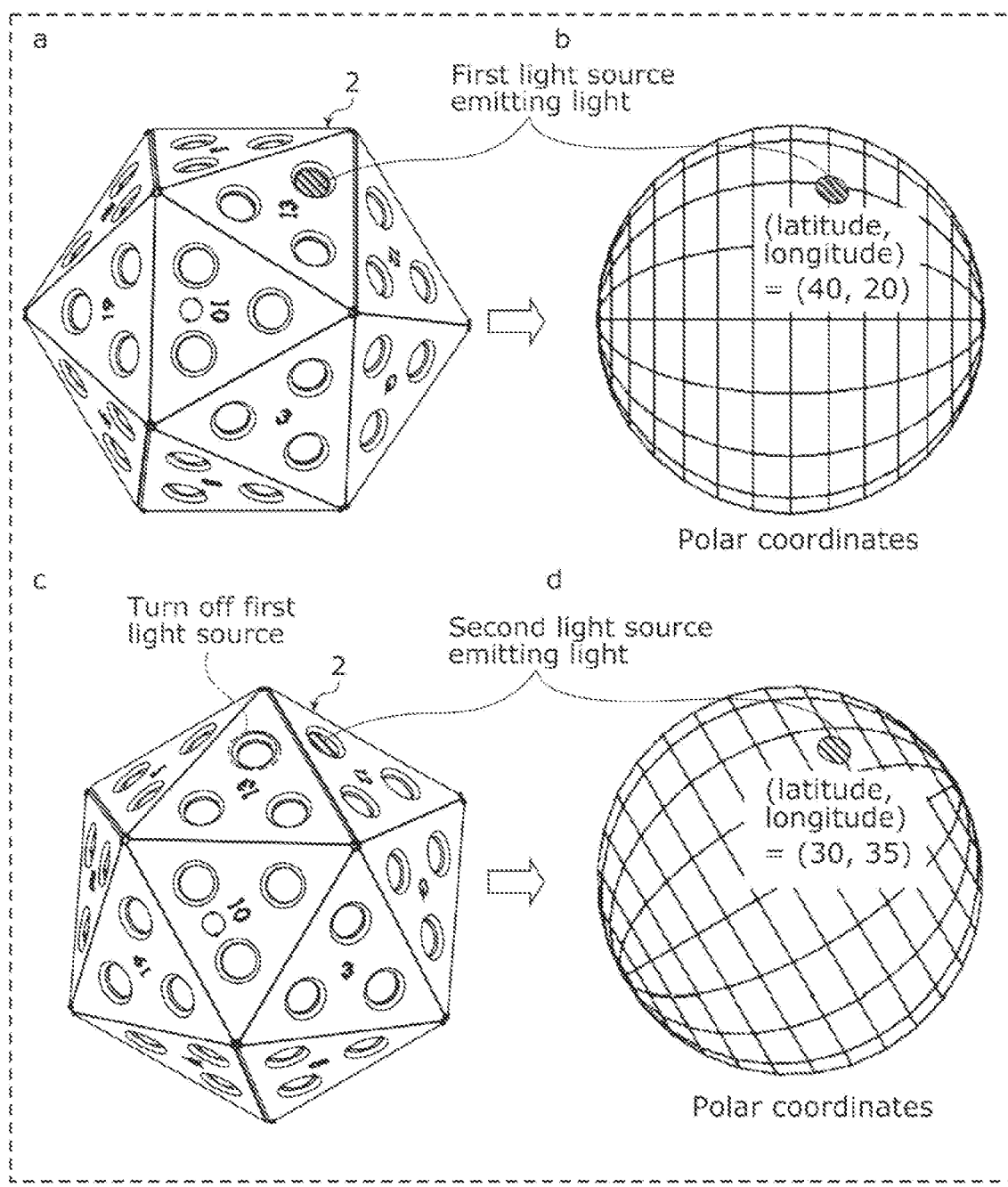
FIG. 9 is a diagram illustrating a light-emission pattern reconfigured when an installation orientation of the lighting device according to the embodiment is changed.

FIG. 8 is a flow chart illustrating a processing operation when an installation orientation of lighting device 2 according to the embodiment is changed. FIG. 9 is a diagram illustrating a light-emission pattern reconfigured when an installation orientation of lighting device 2 according to the embodiment is changed.

First, as shown in FIG. 8, first detector 21 detects a change in installation orientation of lighting device 2 (S21). In other words, when lighting device 2 disposed in a first orientation as a predetermined installation orientation is changed to a second orientation different from the first orientation, first detector 21 detects the change in installation orientation. Naturally, lighting device 2 is in a start-up state.

Next, first detector 21 detects an amount of rotation corresponding to the change in installation orientation of lighting device 2 (S22). First detector 21 outputs, to controller 12, information indicating the amount of rotation of lighting device 2 detected. Controller 12 stores, into storage 15, the information indicating the amount of rotation of lighting device 2 obtained.

Then, controller 12 reconfigures polar coordinates in lighting device 2 based on the information indicating the amount of rotation (S23), and updates a light-emission pattern to a reconfigured light-emission pattern (S24).

Specifically, controller 12 performs affine transformation on light source 11 at the time of the second orientation (after reconfiguration) corresponding to light source 11 at the time of the first orientation (before reconfiguration), based on the information indicating the amount of rotation, to reconfigure the polar coordinates in lighting device 2. For example, as shown in (a) and (b) in FIG. 9, in the case where light source 11 (referred to as a first light source) located at (latitude, longitude)=(40, 20) in lighting device 2 is emitting light when lighting device 2 is in the first orientation, after lighting device 2 is changed to the second orientation, as shown in (c) and (d) in FIG. 9, the first light source is turned off, and light source 11 (referred to as a second light source) located at the same position as or closest to the first light source located at (latitude, longitude)=(40, 20) at the time of the first orientation is caused to emit light. To put it another way, controller 12 causes the first light source located at (latitude, longitude)=(40, 20) in lighting device 2 to emit light when lighting device 2 is in the first orientation; and turns off the first light source located at (latitude, longitude)=(40, 20) in lighting device 2 and causes the second light source located at (latitude, longitude)=(30, 35) in lighting device 2 to emit light, after lighting device 2 is changed to the second orientation. Accordingly, even when the installation orientation of lighting device 2 is changed, controller 12 controls the plurality of light sources 11 to substantially maintain the light-emission position when lighting device 2 is observed from the fixed point, by changing light source 11 caused to emit light on lighting device 2. This allows lighting device 2 to continue radiating light in the same orientation (direction).

Even when the installation orientation of lighting device 2 is changed, lighting device 2 makes it possible to maintain the light-emission pattern (cause the light-emission pattern to substantially remain unchanged) in the case lighting device 2 is observed from the fixed point.

Figure 10:
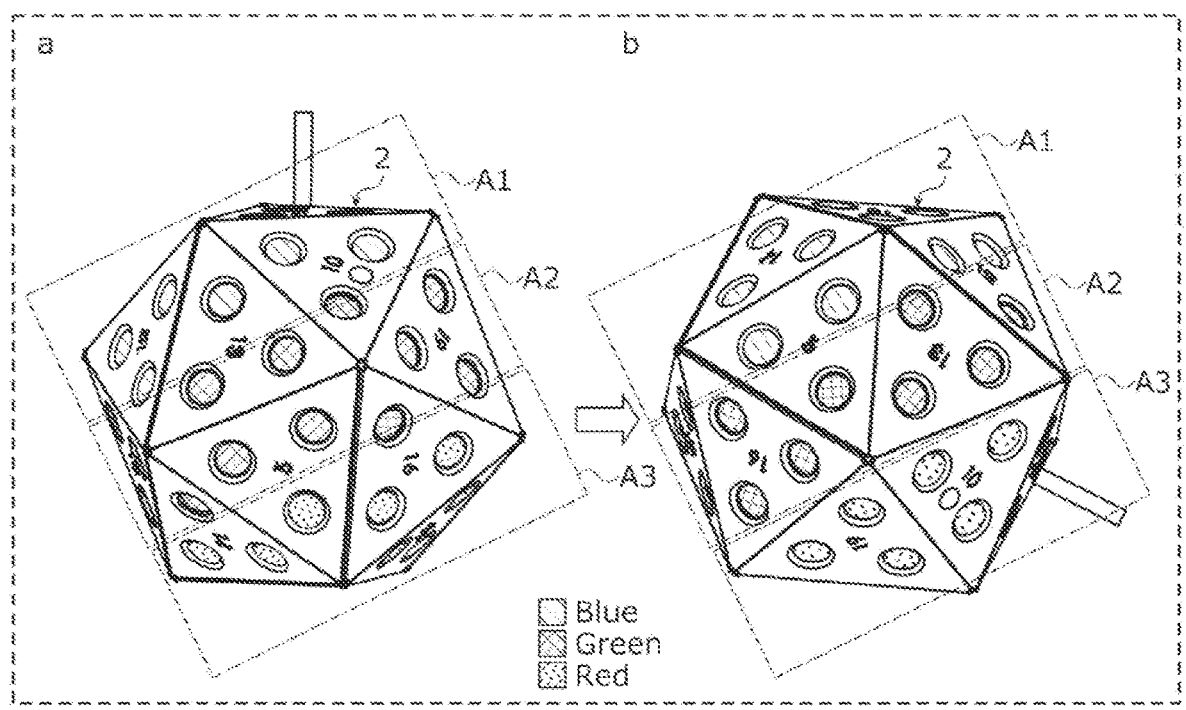
FIG. 10 is a diagram illustrating a light-emission pattern reconfigured when an installation orientation of the lighting device according to the embodiment is changed in the case where the entire lighting device is caused to emit light.

A situation in which, for example, a light-emission pattern is maintained even when an installation orientation of lighting device 2 is changed in a state in which entire lighting device 2 is caused to emit light is described with reference to FIG. 10. FIG. 10 is a diagram illustrating a light-emission pattern reconfigured when an installation orientation of lighting device 2 according to the embodiment is changed in the case where entire lighting device 2 is caused to emit light.

When lighting device 2 shown in (a) in FIG. 10 is observed from a fixed point, lighting device 2 is emitting blue light as shown by diagonal hatching in frame A1 indicated by a chain double-dashed line, green light as shown by lattice hatching in frame A2 indicated by a chain double-dashed line, and red light as shown by dot hatching in frame A3 indicated by a chain double-dashed line.

Even when the installation orientation of lighting device 2 shown in (a) in FIG. 10 is changed by turning lighting device 2 clockwise as shown in (b) in FIG. 10, lighting device 2 shown in (b) in FIG. 10 emits the blue light as shown by the diagonal hatching in frame A1 indicated by the chain double-dashed line, the green light as shown by the lattice hatching in frame A2 indicated by the chain double-dashed line, and the red light as shown by the dot hatching in frame A3 indicated by the chain double-dashed line.

Stated differently, when observed from the fixed point, lighting device 2 in the installation orientation shown in (a) in FIG. 10 and lighting device 2 in the installation orientation shown in (b) in FIG. achieve substantially the same light-emission patterns in frames A1, A2, and A3 shown in (a) and (b) in FIG. 10.

<Light-Emission Pattern>

Lighting device 2 makes it possible to achieve, for example, the following light-emission patterns.

[Light-Emission Pattern Example 1]

Figure 11:
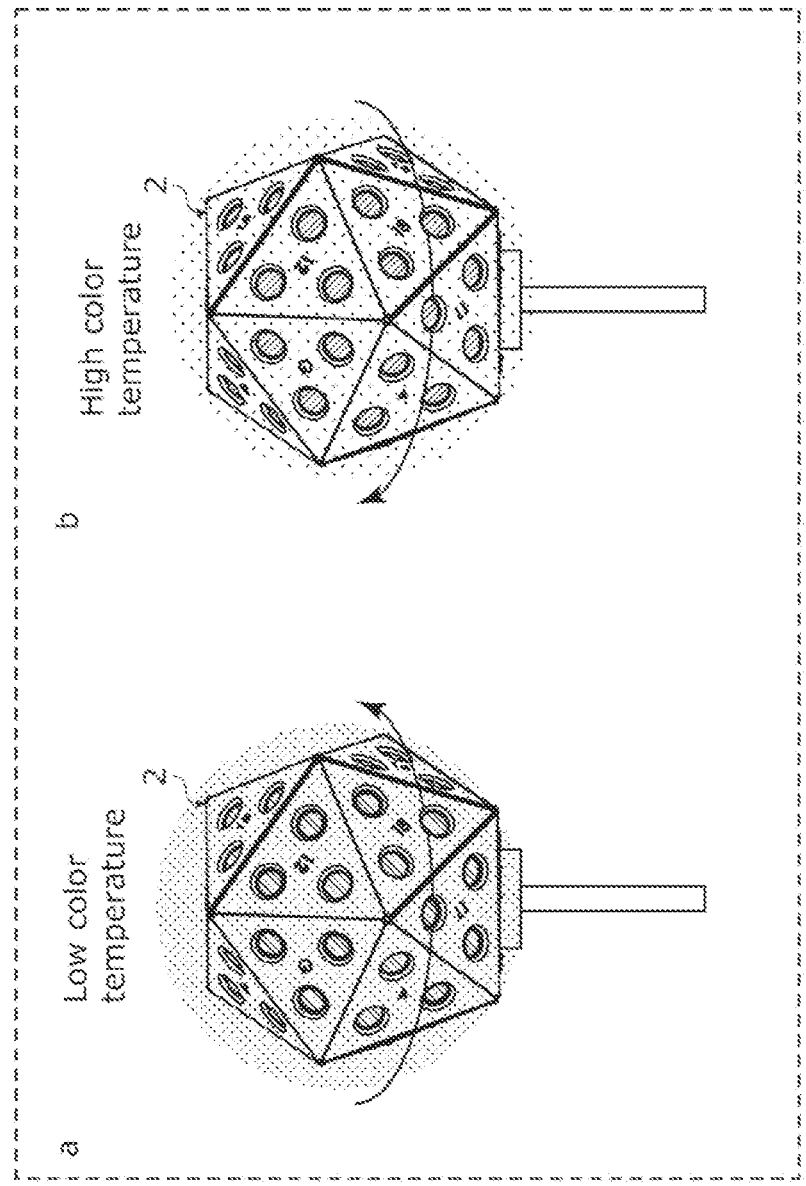
FIG. 11 is a diagram illustrating light-emission pattern example 1 reconfigured when an installation orientation of the lighting device according to the embodiment is changed.

FIG. 11 is a diagram illustrating light-emission pattern example 1 reconfigured when an installation orientation of lighting device 2 according to the embodiment is changed.

(a) and (b) in FIG. 11 exemplify lighting device 2 mounted on a stand that is installed on a floor and long in the vertical direction. Lighting device 2 is rotatably provided on the stand with the vertical direction as an axis.

When controller 12 obtains information indicating a rotation direction of lighting device 2 detected by first detector 21, controller 12 controls a plurality of light sources 11 to change a light-emission pattern of lighting device 2 according to the rotation direction indicated in the information.

For example, when lighting device 2 is rotated counterclockwise as shown by the arrow in (a) in FIG. 11, lighting device 2 emits light at a low color temperature lower than or equal to a temperature of an incandescent color; and when lighting device 2 is rotated clockwise as shown by the arrow in (b) in FIG. 11, lighting device 2 emits light at a high color temperature higher than or equal to a temperature of a neutral white color. It should be noted that when lighting device 2 is rotated clockwise, lighting device 2 may emit light at a low color temperature lower than or equal to a temperature of an incandescent color; and when lighting device 2 is rotated counterclockwise, lighting device 2 may emit light at a high color temperature higher than or equal to a temperature of a neutral white color. Moreover, in the present embodiment, neutral white color light is emitted at a color temperature of approximately 6500 K, and incandescent color light is emitted at a color temperature of approximately 2700 K. It should be noted that the color temperatures exemplified in the present embodiment are mere examples, the present disclosure is not limited to the values, the incandescent color, and the neutral white color described in the present embodiment, and a warm white color and a daylight color may be used. Additionally, controller 12 may control the plurality of light sources 11 to gradually increase or decrease a color temperature as a rotation angle of lighting device 2 is increased.

[Light-Emission Pattern Example 2]

Figure 12:
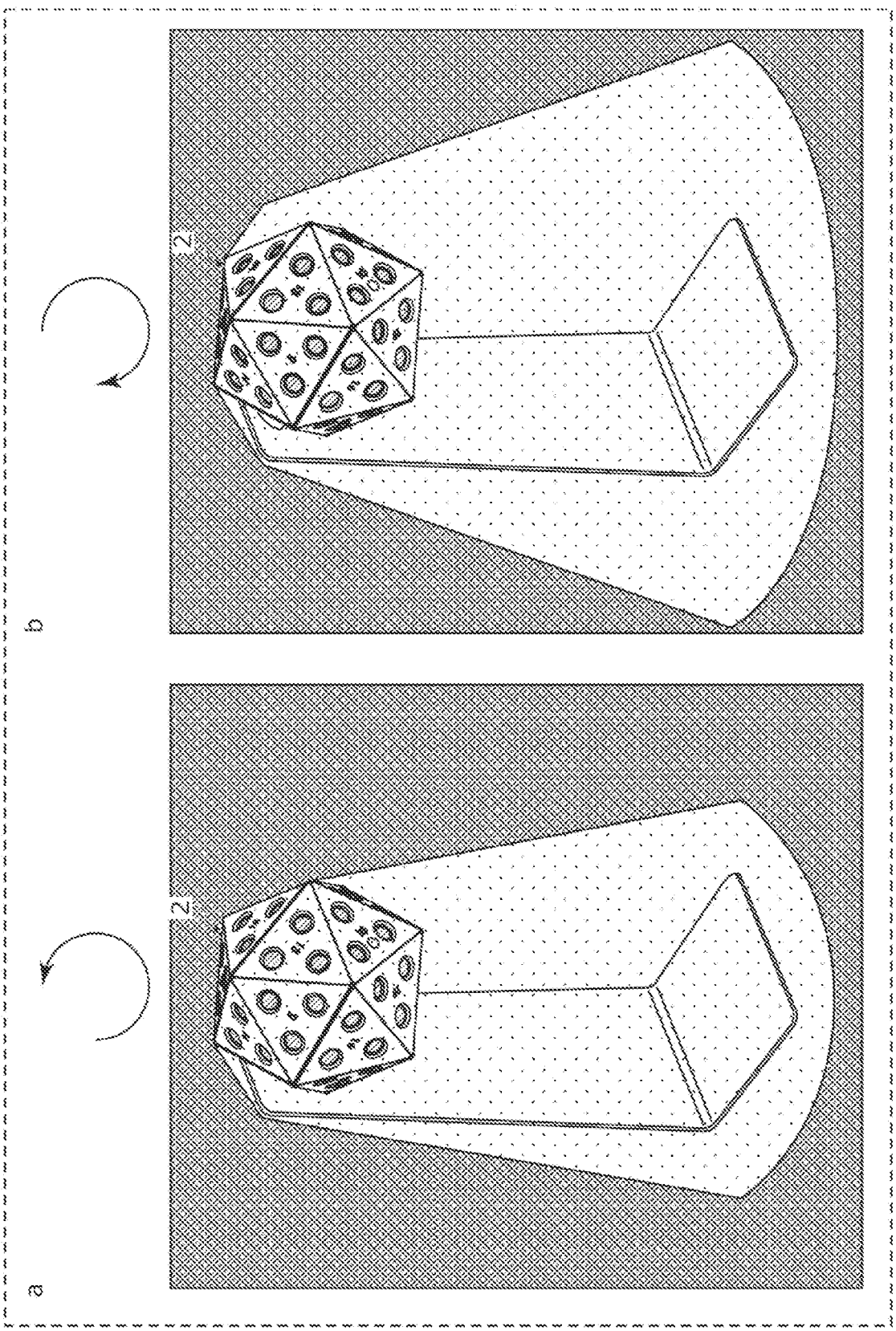
FIG. 12 is a diagram illustrating light-emission pattern example 2 reconfigured when an installation orientation of the lighting device according to the embodiment is changed.

FIG. 12 is a diagram illustrating light-emission pattern example 2 reconfigured when an installation orientation of lighting device 2 according to the embodiment is changed.

(a) and (b) in FIG. 12 exemplify lighting device 2 mounted on a stand that extends in a direction (horizontal direction) orthogonal to a wall surface that extends in the vertical direction. Lighting device 2 is rotatably provided on the stand with the horizontal direction as an axis.

Even in this case, when controller 12 obtains information indicating a rotation direction of lighting device 2 detected by first detector 21, controller 12 controls a plurality of light sources 11 to change a light-emission pattern of lighting device 2 according to the rotation direction indicated in the information.

For example, when lighting device 2 is rotated counterclockwise when viewed opposite to lighting device 2 as shown by the arrow in (a) in FIG. 12, lighting device 2 performs light distribution control to achieve a narrow-angle light distribution; and when lighting device 2 is rotated counterclockwise when viewed from a stand side as shown by the arrow in (b) in FIG. 12, lighting device 2 performs light distribution control to achieve a wide-angle light distribution. It should be noted that when lighting device 2 is rotated clockwise when viewed opposite to lighting device 2, lighting device 2 may perform light distribution control to achieve a narrow-angle light distribution; and when lighting device 2 is rotated counterclockwise when viewed opposite to lighting device 2, lighting device 2 may perform light distribution control to achieve a wide-angle light distribution. It should be noted that light distribution control may be achieved by a drive mechanism that changes a relative distance between light-emitting elements 11a and transmissive portions 6, and controller 12 that controls the drive mechanism.

It should be noted that light-emission pattern examples 1 and 2 may be simultaneously performed in combination with the configuration described in light-emission pattern example 1. For example, when lighting device 2 is simply disposed on a desk, lighting device 2 may be rotated clockwise or counterclockwise with the vertical direction as an axis to change color temperatures of light emitted by the plurality of light sources 11, and further lighting device 2 may be rotated clockwise or counterclockwise with the horizontal direction as an axis to perform light distribution control to achieve a narrow-angle light distribution or a wide-angle light distribution.

[Light-Emission Pattern Example 3]

Figure 13:
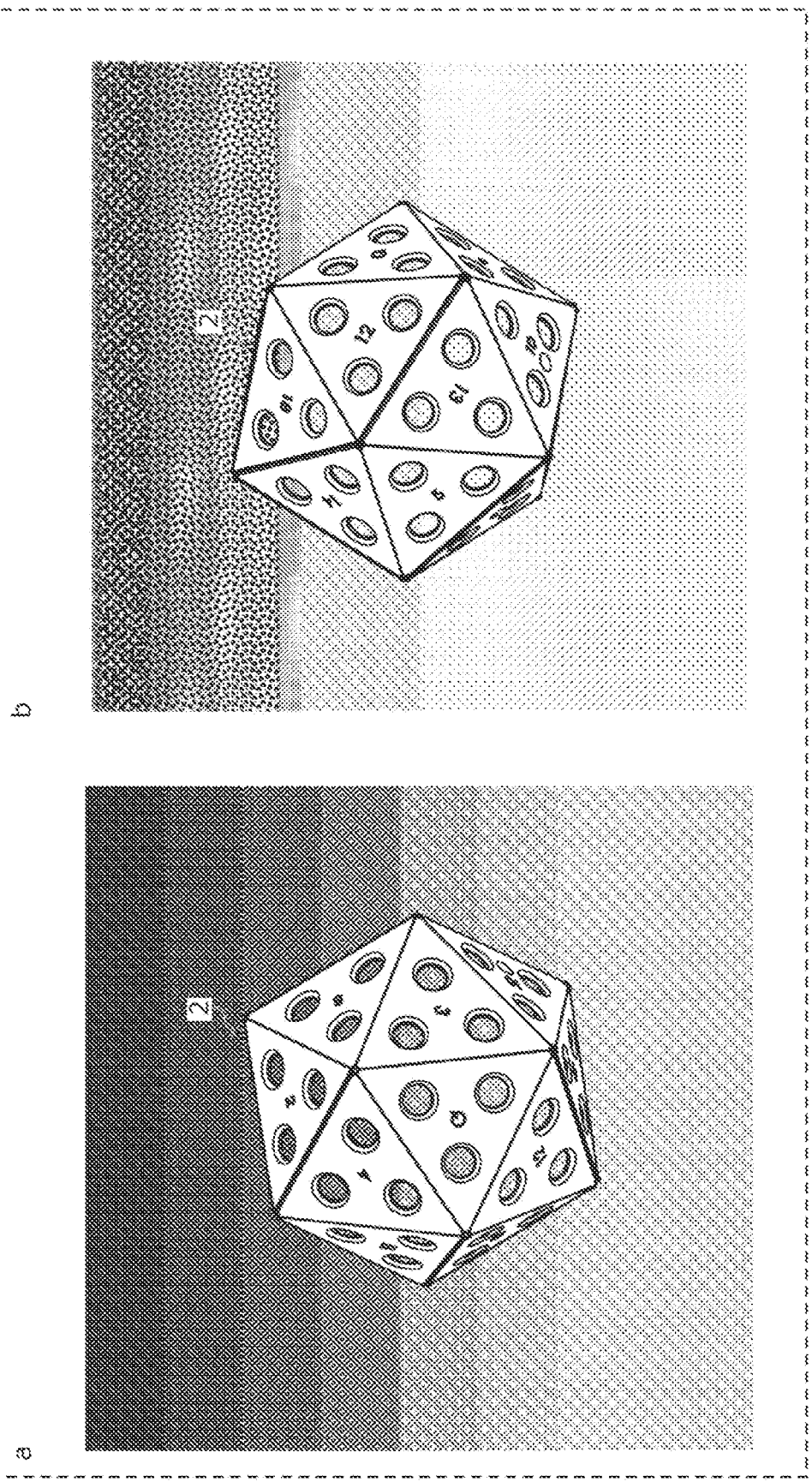
FIG. 13 is a diagram illustrating light-emission pattern example 3 reconfigured when an installation orientation of the lighting device according to the embodiment is changed.

FIG. 13 is a diagram illustrating light-emission pattern example 3 reconfigured when an installation orientation of lighting device 2 according to the embodiment is changed.

Lighting device 2 shown in FIG. 13 is freely rotatably provided on, for example, a desk or a floor. Each face of case 5 of lighting device 2 is assigned with a number. Moreover, in lighting device 2 in light-emission pattern example 3, light sources 11 are disposed on all twenty faces. As stated above, since lighting device 2 is an icosahedron in the present embodiment, a light-emission pattern is changed according to the number assigned to a face located at the top of case 5 (a face orthogonal to the vertical direction). The light-emission patterns corresponding one-to-one to the twenty faces are stored in storage 15 in advance. Controller 12 estimates the face located at the top from the installation orientation of lighting device 2, based on upward and downward directions and the origin set. Controller 12 causes the plurality of light sources 11 to emit light in the light-emission pattern associated with the face located at the top.

(a) in FIG. 13 exemplifies, for example, a light-emission pattern when a face assigned with No. 2 is located at the top. In No. 2, light source 11 located closer to a vertical upper side emits darker red light, and light source 11 located closer to a vertical lower side emits light having a color that gradually changes from red to yellow. Moreover, (b) in FIG. 13 exemplifies, for example, a light-emission pattern when a face assigned with No. 16 is located at the top. In No. 16, light source 11 located closer to a vertical upper side emits bluer light, and light source 11 located closer to a vertical lower side emits greener light.

[Light-Emission Pattern Example 4]

Figure 14:
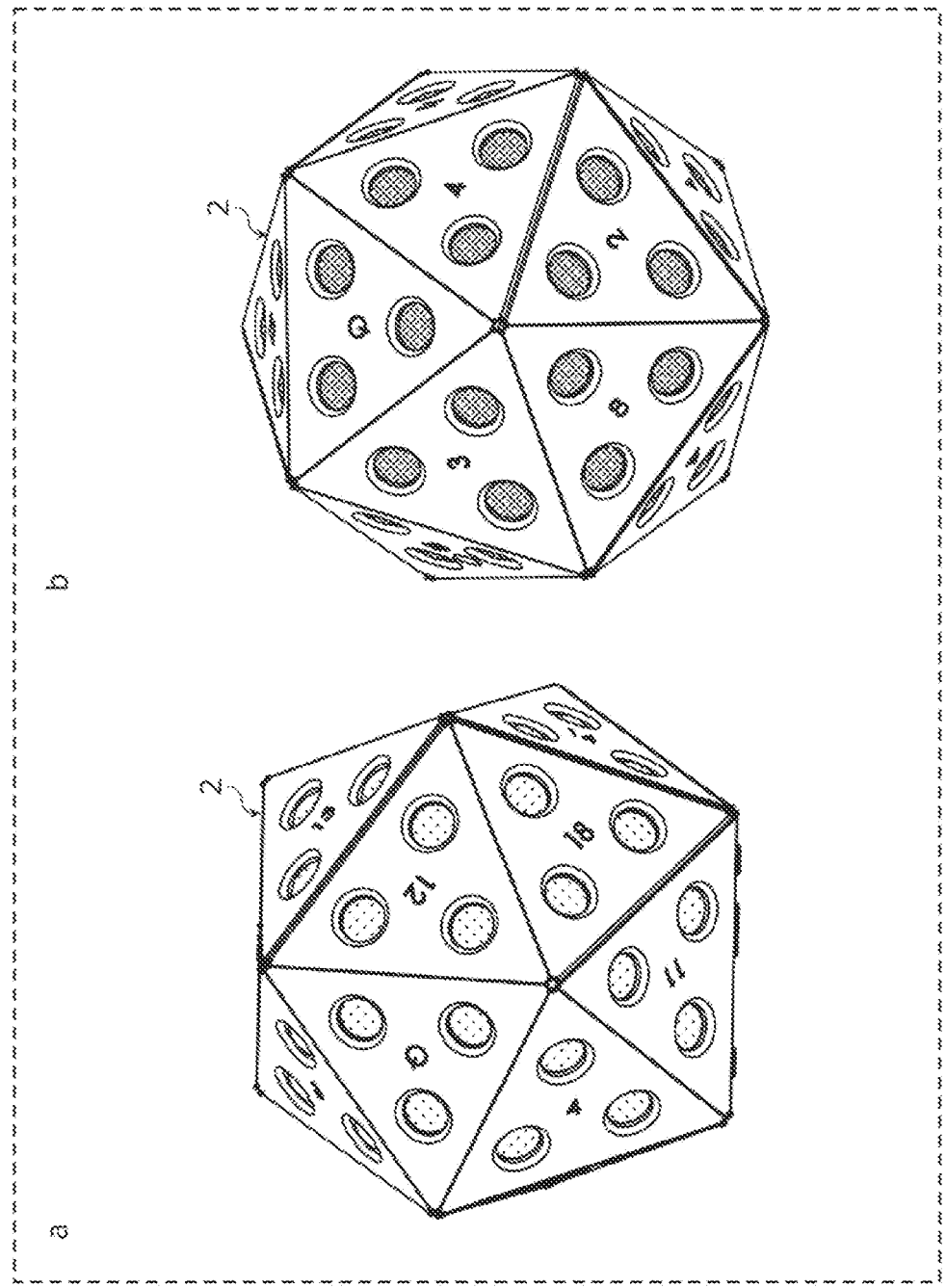
FIG. 14 is a diagram illustrating light-emission pattern example 4 reconfigured when an installation orientation of the lighting device according to the embodiment is changed.

FIG. 14 is a diagram illustrating light-emission pattern example 4 reconfigured when an installation orientation of lighting device 2 according to the embodiment is changed.

Lighting device 2 shown in FIG. 14 is also freely rotatably provided on, for example, a desk or a floor.

(a) in FIG. 14 exemplifies a situation in which lighting device 2 emits light when lighting device 2 is in a first orientation. (b) in FIG. 14 exemplifies a situation in which, when lighting device 2 is displaced from the first orientation to a second orientation, lighting device 2 emits light in a light-emission pattern randomly selected.

When controller 12 obtains information indicating a rotation direction of lighting device 2 detected by first detector 21, controller 12 randomly selects a light-emission pattern from among a plurality of light-emission patterns stored in storage 15, according to the rotation direction indicated in the information. Controller 12 causes a plurality of light sources 11 to emit light in the light-emission pattern selected.

In other words, although the corresponding light-emission pattern is associated with the face located at the top of case 5 in light-emission pattern example 3, there is no such an association in light-emission pattern example 4. In light-emission pattern example 4, even when lighting device 2 is displaced from the first orientation to the second orientation and is further reverted from the second orientation to the first orientation, a light-emission pattern for the first orientation before the displacement and a light-emission pattern for the first orientation after the displacement may be different.

For this reason, after once an installation orientation of lighting device 2 is changed, even when lighting device 2 is reverted to the same orientation and the same installation orientation as before the change, lighting device 2 does not necessarily emit light in the same light-emission pattern.

Advantageous Effects

Next, advantageous effects of lighting device 2, the lighting control method, and the program according to the present embodiment are described.

As stated above, lighting device 2 according to the present embodiment includes: a plurality of light sources 11 that illuminate in all directions; first detector 21 that detects an installation orientation of lighting device 2; and controller 12 that changes a light-emission pattern of each of the plurality of light sources 11 according to the installation orientation of lighting device 2 detected by first detector 21.

Accordingly, it is possible to change the light-emission pattern of each of the plurality of light sources 11 in conformance with the change in installation orientation of lighting device 2. For example, in the case where lighting device 2 is observed from a fixed point, even when the installation orientation of lighting device 2 is changed, it is possible to cause the light-emission pattern to remain unchanged. In other words, even when the installation orientation of lighting device 2 is changed, lighting device 2 makes it possible to cause the light-emission pattern to automatically change according to the installation orientation.

Moreover, since a light-emission pattern when a conventional lighting device is observed from a fixed point is changed after an orientation of the conventional lighting device is changed, it is necessary to reconfigure the light-mission pattern of the conventional lighting device. However, in the present embodiment, since a user need not reconfigure a light-emission pattern according to a change in orientation of lighting device 2, efforts necessary for reconfiguration are unlikely to be increased.

Accordingly, lighting device 2 capable of illuminating in all directions makes it easy to perform setting changes for the light-emission pattern of lighting device 2.

In particular, since it is possible to change the light-emission pattern of each of the plurality of light sources 11 according to the installation orientation, it is also possible to perform an interactive operation by moving lighting device 2.

Furthermore, since the user does not perceive a change in light-emission pattern when the user observes lighting device 2 from a fixed point, lighting device 2 makes it possible to achieve a light-emission pattern that does not easily cause a sense of discomfort to the user.

A lighting control method according to the present embodiment includes: detecting an installation orientation of lighting device 2; changing a light-emission pattern of each of a plurality of light sources 11 according to the installation orientation, the plurality of light sources 11 illuminating in all directions; and controlling each of the plurality of light sources 11 to cause a light-emission pattern when lighting device 2 emits light in a first orientation and a light-emission pattern when lighting device 2 emits light in a second orientation to be maintained as a same light-emission pattern, the second orientation being different from the first orientation.

The lighting control method also produces the same advantageous effects as above.

A program according to the present embodiment causes a computer to execute the lighting control method.

The program also produces the same advantageous effects as above.

Moreover, in lighting device 2 according to the present embodiment, controller 12 controls each of the plurality of light sources 11 to cause a light-emission pattern when lighting device 2 emits light in a first orientation and a light-emission pattern when lighting device 2 emits light in a second orientation to be maintained as a same light-emission pattern, the second orientation being different from the first orientation.

Accordingly, even when an installation orientation of lighting device 2 is suddenly changed in the case where lighting device 2 is illuminating an illuminated surface in a predetermined light-emission pattern, lighting device 2 makes it possible to cause the light-emission patterns in which the illuminated surface is illuminated to be substantially maintained as the same light-emission pattern between before and after the change in installation orientation.

Furthermore, lighting device 2 according to the present embodiment includes first detector 21 that detects a rotational acceleration rate of lighting device 2. Controller 12 estimates an amount of change in the light-emission pattern of each of the plurality of light sources 11 according to the rotational acceleration rate detected by first detector 21, and controls the light-emission pattern of each of the plurality of light sources 11.

For example, when lighting device 2 is rapidly rotated, calculating a rotation for light-emission patterns of the plurality of light sources 11 after detecting an installation orientation of lighting device 2 may cause a delay in controlling the light-emission patterns.

According to the present embodiment, however, it is possible to forecast (predict) an amount of rotation from a rotational acceleration rate of lighting device 2 and a time necessary for calculating the rotational acceleration rate. Accordingly, since it is possible to control the light-emission patterns of the plurality of light sources 11 based on the amount of rotation predicted, it is possible to prevent a delay in controlling the light-emission patterns of the plurality of light sources 11. As a result, it is possible to achieve light-emission patterns that do not easily cause a sense of discomfort to the user.

Moreover, lighting device 2 according to the present embodiment includes second detector 22 that detects northward, southward, eastward, westward, upward, and downward directions with respect to lighting device 2. Controller 12 sets a default value according to the northward, southward, eastward, westward, upward, and downward directions with respect to lighting device 2 detected by second detector 22.

Accordingly, when lighting device 2 is in an initial state, it is possible to determine in which direction lighting device 2 is oriented. For this reason, even when lighting device 2 is disposed in any installation orientation in any direction, it is possible to appropriately set the initialization of lighting device 2.

Furthermore, in lighting device 2 according to the present embodiment, second detector 22 is at least one of a gyroscope sensor or an electronic compass.

Accordingly, when second detector 22 is at least one of a gyroscope sensor or an electronic compass, it is possible to accurately determine an orientation and an installation orientation of lighting device 2. For this reason, even when the installation orientation of lighting device 2 is changed, it is possible to maintain a light-emission pattern set for lighting device 2.

In particular, in the case where second detector 22 is an electronic compass, even when lighting device 2 is turned OFF, it is possible to continue storing the origin set in the initialization. Moreover, even when lighting device 2 is turned OFF and moved to another place, since the orientation of lighting device 2 is stored, it is unnecessary to set again the origin of lighting device 2. Accordingly, a processing burden created by the initialization of lighting device 2 and the trouble of setting by the user are unlikely to be increased.

Moreover, lighting device 2 according to the present embodiment includes storage 15 in which the light-emission patter of each of the plurality of light sources 11 is stored. Controller 12 executes the light-emission pattern stored in storage 15.

Accordingly, storing light-emission patterns makes it possible to replicate a light-emission pattern set once.

OTHER VARIATIONS

Although the lighting device, the lighting control method, and the program according to the present disclosure have been described above based on the foregoing embodiment, the present disclosure is not limited to the embodiment. Forms obtained by various modifications to the foregoing embodiment that can be conceived by those skilled in the art may be included in the scope of the present disclosure, as long as they do not depart from the essence of the present disclosure.

For example, each unit included in the lighting device, the lighting control method, and the program according to the foregoing embodiment is typically implemented as an LSI which is an integrated circuit. They may take the form of individual chips, or some or all of them may be encapsulated into a single chip.

Furthermore, the integrated circuit is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the foregoing embodiment, each of the constituent components may be implemented as dedicated hardware or may be realized by executing a software program suited to such structural components. Alternatively, each of the constituent components may be implemented by a program executor such as a CPU or a processor reading out and executing the software program recorded in a recording medium such as a hard disk or a semiconductor memory.

Furthermore, all numerical values used above are mere examples for specifically describing the present disclosure, and thus the embodiment of the present disclosure is not limited by these exemplary numerical values.

Furthermore, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Moreover, the functions of a plurality of functional blocks having similar functions may be processed by single hardware or software in a parallelized or time-divided manner.

Furthermore, the order of executing the steps shown in the flow charts is a mere illustration for specifically describing the present disclosure, and thus may be an order other than the shown order. Also, one or more of the steps may be executed simultaneously (in parallel) with another step.

It should be noted that the present disclosure includes forms obtained by making various modifications to the foregoing embodiment that can be conceived by those skilled in the art, as well as forms realized by arbitrarily combining constituent components in different embodiments, without materially departing from the essence of the present disclosure.

The invention claimed is:

1. A lighting device comprising:
a plurality of light sources that illuminate in all directions;
a first detector that detects an installation orientation of the lighting device;
a controller that changes a light-emission pattern of each of the plurality of light sources according to the installation orientation of the lighting device detected by the first detector; and
a second detector that detects a rotational acceleration rate of the lighting device, wherein the controller:
estimates an amount of change from a light-emission pattern when the lighting device emits light in a first orientation to a light-emission pattern when the lighting device emits light in a second orientation different from the first orientation, according to the rotational acceleration rate, and
controls the light-emission pattern of each of the plurality of light sources based on the amount of change.

2. The lighting device according to claim 1,
wherein the controller controls each of the plurality of light sources to cause a light-emission pattern when the lighting device emits light in a first orientation and a light-emission pattern when the lighting device emits light in a second orientation to be maintained as a same light-emission pattern, the second orientation being different from the first orientation.

3. The lighting device according to claim 1, comprising:
a third detector that detects northward, southward, eastward, westward, upward, and downward directions with respect to the lighting device,
wherein the controller sets a default value according to the northward, southward, eastward, westward, upward, and downward directions with respect to the lighting device.

4. The lighting device according to claim 1,
wherein the first detector is at least one of a gyroscope sensor or an electronic compass.

5. The lighting device according to claim 1, comprising:
a storage in which the light-emission pattern of each of the plurality of light sources is stored,
wherein the controller executes the light-emission pattern stored in the storage.

6. A lighting control method comprising:
detecting an installation orientation of the lighting device;
changing a light-emission pattern of each of a plurality of light sources according to the installation orientation, the plurality of light sources illuminating in all directions;
controlling each of the plurality of light sources to cause a light-emission pattern when the lighting device emits light in a first orientation and a light-emission pattern when the lighting device emits light in a second orientation to be maintained as a same light-emission pattern, the second orientation being different from the first orientation;
detecting a rotational acceleration rate of the lighting device;
estimating an amount of change from a light-emission pattern when the lighting device emits light in a first orientation to a light-emission pattern when the lighting device emits light in a second orientation different from the first orientation, according to the rotational acceleration rate, and
controlling the light-emission pattern of each of the plurality of light sources based on the amount of change.

7. A non-transitory computer-readable recording medium having recorded thereon a computer program for causing a computer to execute the lighting control method according to claim 6.

* * * * *